United States Patent [19]

Carter et al.

[11] 4,289,514
[45] Sep. 15, 1981

[54] STACKED RE-ENTRANT ARM VAPOR-LIQUID SEPARATOR

[75] Inventors: Hudson R. Carter, Alliance; John H. Kidwell, Louisville; William P. Prueter, Alliance, all of Ohio

[73] Assignee: The Babcock & Wilcox Company, New Orleans, La.

[21] Appl. No.: 162,717

[22] Filed: Jun. 25, 1980

[51] Int. Cl.³ .................. B01D 45/12; F22B 37/32
[52] U.S. Cl. ........................ 55/398; 55/347; 55/448; 122/34; 122/492
[58] Field of Search .......... 55/345, 346, 348, 398, 55/448, 450, 452, 455, 458; 122/34, 491, 492

[56] References Cited

U.S. PATENT DOCUMENTS

| | | | |
|---|---|---|---|
| 696,601 | 4/1902 | Sims | 55/446 |
| 2,560,077 | 7/1951 | Bloomer et al. | 55/237 |
| 2,654,351 | 10/1953 | Ammon | 55/455 |
| 2,970,671 | 2/1961 | Warner | 55/327 |
| 3,086,343 | 4/1963 | Stern | 55/456 |
| 3,296,779 | 1/1967 | Daman et al. | 55/337 |
| 3,314,220 | 4/1967 | Goldstein | 55/343 |
| 3,507,099 | 4/1970 | Marshall | 55/456 |
| 3,924,575 | 12/1975 | Zipay | 122/34 |
| 3,992,172 | 11/1976 | Clark | 55/455 |

*Primary Examiner*—David L. Lacey
*Attorney, Agent, or Firm*—R. J. Edwards; R. C. Mai

[57] ABSTRACT

An improved centrifugal separator for vapor-liquid mixtures having a vertical upflow conduit closed at the top end and open at the bottom end. A plurality of curved arms similar in shape to a truncated torus of rectangular cross-section penetrate and extend within the conduit at its upper portion. A second plurality of curved arms are located immediately below the upper group and are contiguous thereto. The vertical upflow conduit has a lesser internal diameter in the lower portion, interconnected with a greater internal diameter portion in the upper portion by a frusto-conical section.

2 Claims, 11 Drawing Figures

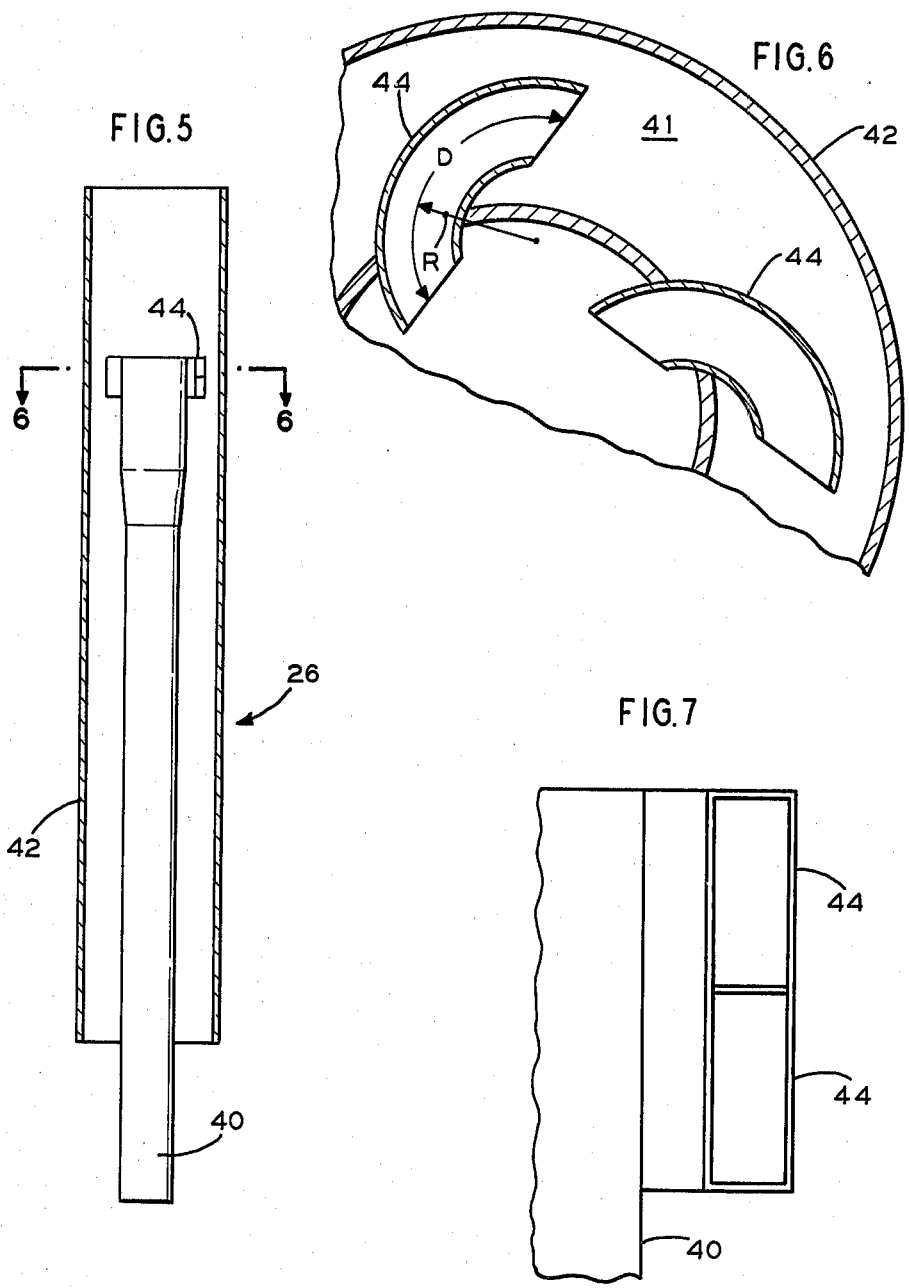

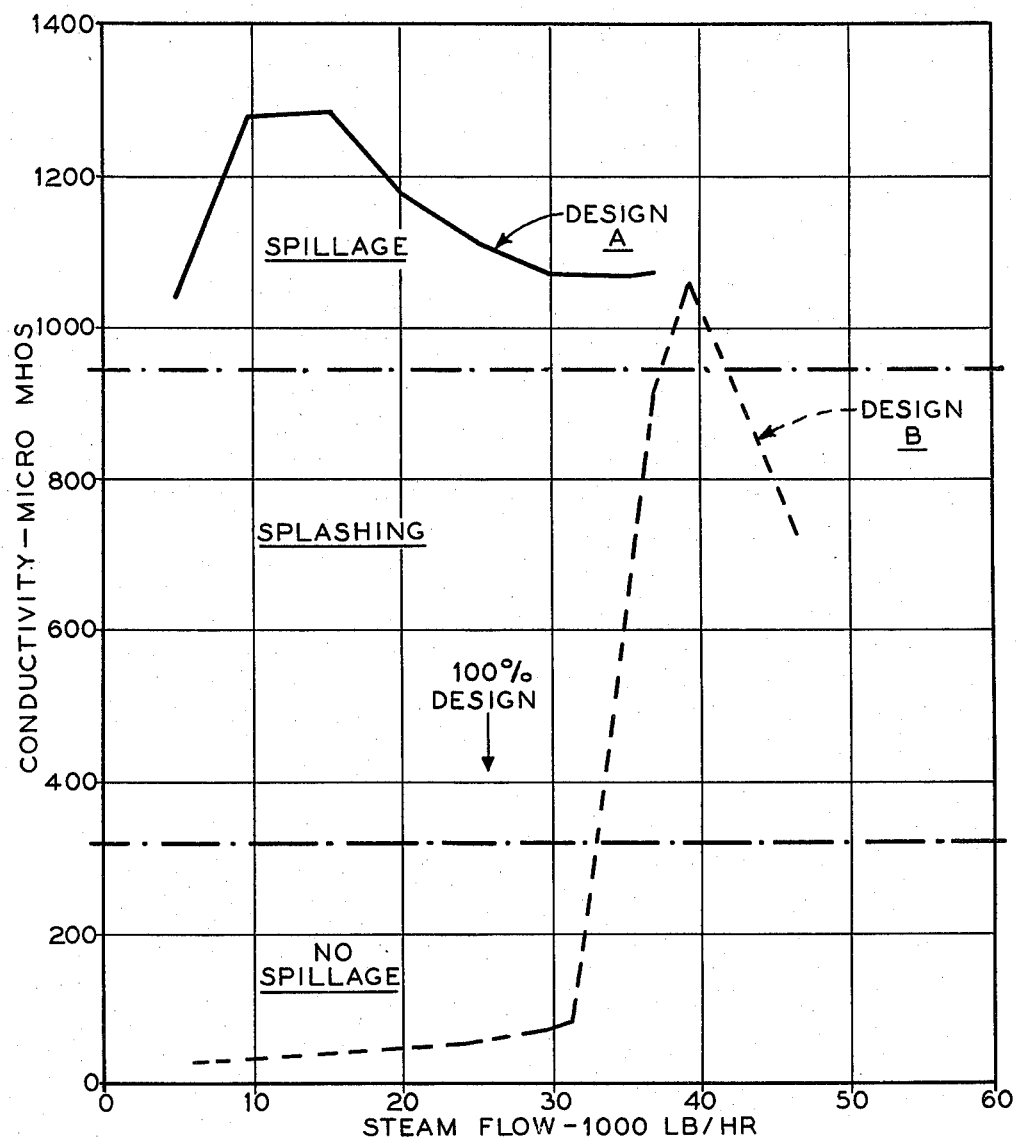

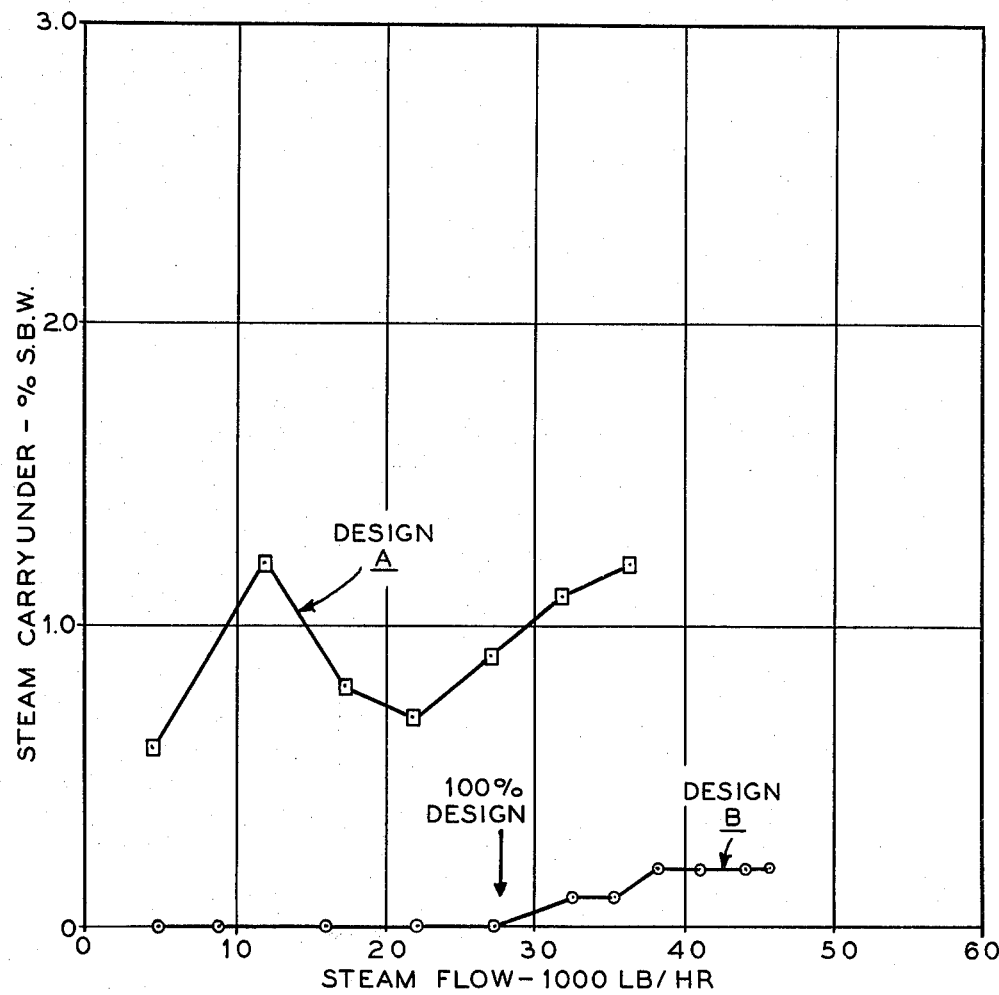

STACKED RE-ENTRANT ARM VAPOR-LIQUID SEPARATOR

BACKGROUND OF THE INVENTION

This invention relates to an improved design of vapor-liquid separators of the type generally used in recirculating nuclear steam generators. More specifically, the improved vapor-liquid separator is vertically disposed in an upper portion of a pressure vessel and with a bottom inlet for upward vertical flow of a vapor-liquid mixture, separation of the phases being effected by centrifugal forces. Steam generators utilizing these separator devices are usually vertically oriented and the number of separators, which may exceed one hundred, which can be installed in the upper portion of a pressure vessel is limited by practical considerations including the diameter of the pressure vessel. Because of technological advances and developments in steam and electric power generation, existing separator designs are no longer capable of meeting present-day stringent requirements involving steam quality and steam generator circulation characteristics.

SUMMARY OF THE INVENTION

The present invention is an improved design of vapor-liquid separators vertically disposed in a pressure vessel having bottom admission of a two-phase mixture into a conduit or riser of varying internal diameter. The upper portion of the conduit is penetrated by a plurality of curved arms which extends into the conduit and receive the mixture flowing therethrough. A second plurality of curved arms penetrates and extends into the conduit, each arm located immediately below and contiguous to a corresponding arm in the upper plurality. The arms discharge the fluid flowing therein into an annulus formed by a cylindrical body or virtual drum concentric to and radially spaced from the conduit. Separated vapor leaves the upper open end of the drum and separated liquid leaves the drum through means disposed at the lower end.

BRIEF DESCRIPTION OF THE DRAWING

FIG. 5 shows a front elevation of a vapor-liquid separator designed in accordance with the invention.

FIG. 6 shows a partial plan section taken along the Lines 6—6 of FIG. 5.

FIG. 7 shows a partial enlarged view in front elevation of a contiguous pair of curved arms connected to the riser.

FIG. 10 is a plot of test results of water spillage in the design indicative of the prior art vs. the invention.

FIG. 11 is a plot of test results of steam carryunder in the design indicative of the prior art vs. the invention.

DESCRIPTION OF THE PREFERRED EMBODIMENTS

Figure 1:
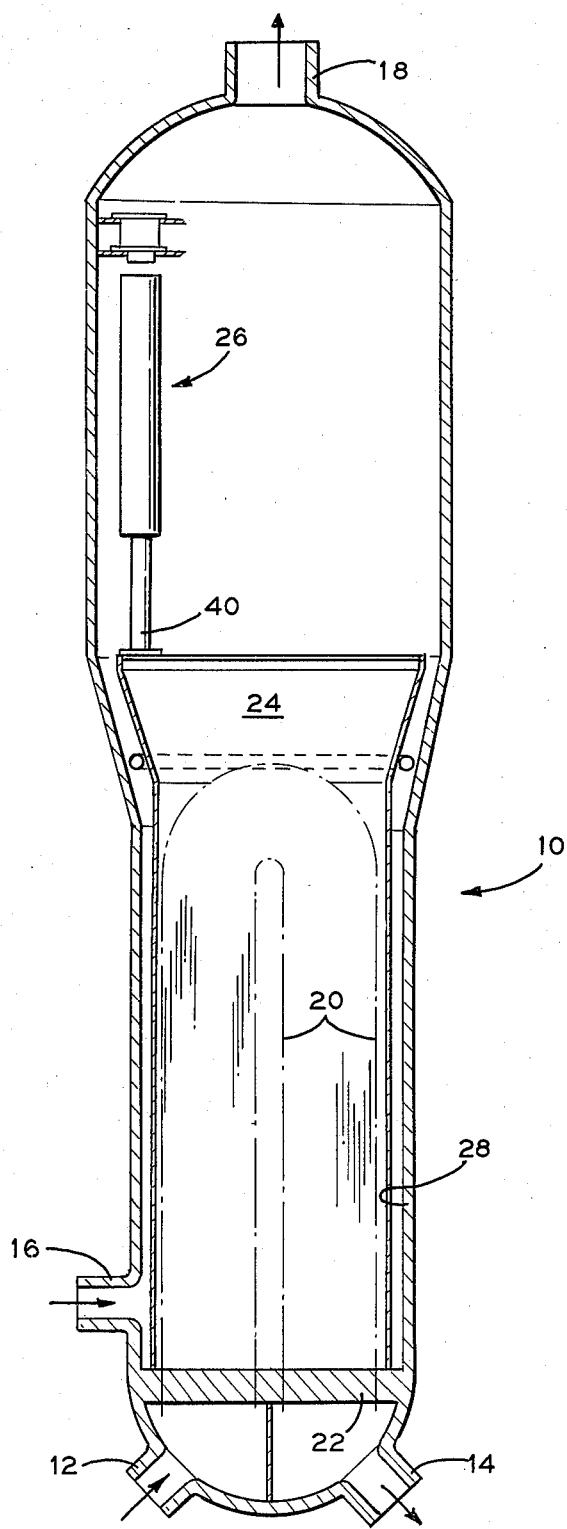
FIG. 1 is a schematic representation of a steam generator utilizing the invention.

Referring to FIG. 1, steam generator 10 comprises a pressure vessel 28. A hot fluid enters the vessel 28 through inlet nozzle 12, flows upward then downward in tubes 20, secured in tube sheet 22 and exits the vessel 28 through outlet nozzle 14. A cold fluid enters vessel 28 through nozzle 16, passes over and around the tubes 20 in heat transfer relationship and enters plenum 24 as a two-phase mixture of vapor and liquid. A plurality of vapor-liquid separators are mounted in the upper portion of vessel 28 and in flow communication with plenum 24 through risers 40. The vapor-liquid mixture is separated in separators 26, the vapor exiting vessel 28 through outlet nozzle 18 and the liquid returned to the lower portion of the vessel 28 for recirculation with incoming cold fluid.

Figure 3:
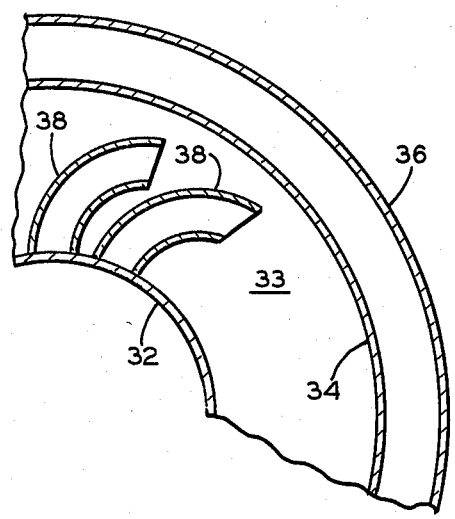
FIG. 3 is a partial plan section taken along the Lines 3—3 of FIG. 2.
Figure 2:
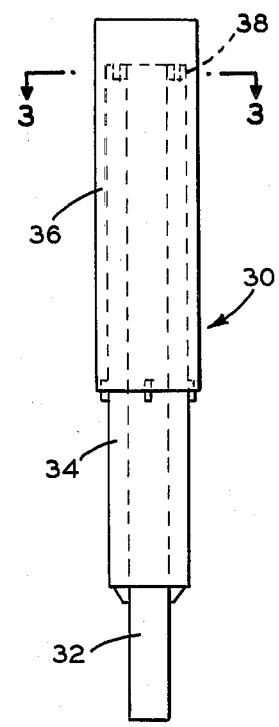
FIG. 2 shows a design indicative of the prior art of a vapor-liquid separator in front elevation as applied to a steam generator in FIG. 1.
Figure 4:
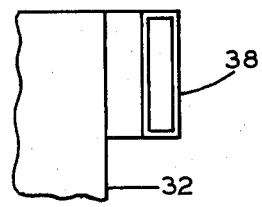
FIG. 4 is a partial enlarged view in front elevation of a curved arm connected to the riser.

Referring to FIGS. 2, 3 and 4, illustrated is a vapor-liquid separator 30 representative of the prior art and designated Design A. A vapor-liquid mixture enters riser 32 from plenum 24, FIG. 1, traverses vertically upward in riser 32 which is closed at its upper end. A plurality of curved arms 38 are radially disposed in one plane at the upper portion of riser 32 and in flow communication therewith. The vapor-liquid mixture enters the curved arms 38 from riser 32 and discharges into an annulus 33 formed between shroud 34 and riser 32. The liquid and vapor phases of the mixture are separated by centrifugal action within the arms 38 and the annulus 33. Shroud 34 is concentric with and radially spaced from riser 32 and is open at the top for discharge of the separated vapor. Means are provided at the lower end of shroud 34 for discharge of the separated liquid. Concentric with and in radially spaced surrounding relationship with shroud 34 is virtual drum 36. Virtual drum 36, similar to shroud 34 is open at the top end for egress of separated vapor and incorporates means at its lower extremity for discharge of separated liquid. Of importance it should be noted that curved arms 38 abut riser 32 but do not penetrate the riser. Of further importance, the curved arms 38 are circumferentially spaced around riser 32 in the same horizontal plane. Test results, to be described subsequently, revealed two undesirable characteristics of Design A. These were water spillage over virtual drum 36 and limited capacity of mixture flow without high moisture carryover levels.

FIGS. 5, 6 and 7 illustrate the improvements in design of vapor-liquid separators over the prior art and designated Design B.

Figure 8:
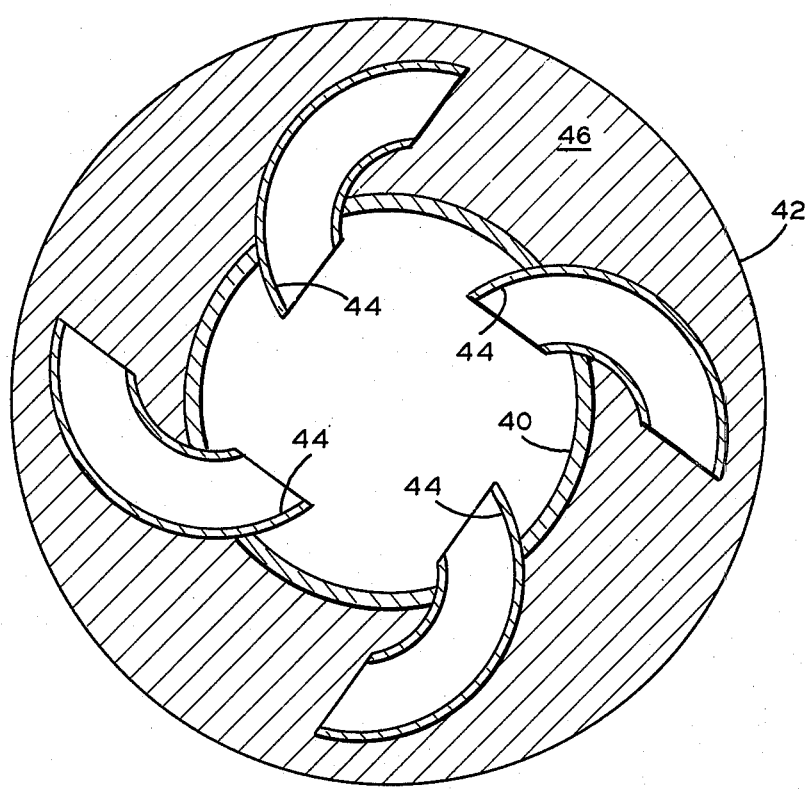
FIG. 8 shows another plan view of the vapor-liquid separator illustrating the free flow area in the instant invention.

A vapor-liquid mixture enters riser 40 from plenum 24, FIG. 1, traverses vertically upward in riser 40 which is closed at its upper end. The lower section of riser 40 has a diameter less than that of the upper section and to which the lower section is connected by a frusto-conical transition section. This feature provides maximum drum volume to accommodate water level fluctuations while maintaining design riser mixture velocity approaching the curved arms 44. The vapor-liquid mixture exits riser 40 through a first plurality of curved arms 44 located in the upper portion of riser 40. Curved arms 44 are similar in shape to a truncated torus, having a rectangular cross-section, the ends of which are coplanar. The arms 44 extend into riser 40 and terminate in the annulus 41 formed between riser 40 and virtual drum 42. Shroud 34 of Design A is eliminated. A second plurality of curved arms is located immediately below the first plurality of curved arms and is contiguous thereto. The aspect ratio of each arm, arm height to arm width, is approximately 3.6. Test results indicated that phase separation takes place in the curved arms and at the virtual drum wall. These tests also showed that adequate free drum area 46, FIG. 8, must be maintained to allow escape of separated vapor from the vicinity of the arms. This has been accomplished by stacking the arms, one above the other and by the elimination of shroud 34, FIG. 2, of Design A. The extension of arms 44 into the riser 40 has several important effects. Test results have shown that phase separation within the arms is enhanced by maximizing the product of the mean arm radius R and its included angle D, FIG. 6, while maintaining an adequate arm to virtual drum spacing. use of the re-entrant arms (extending into the riser), provides an increase in RD while maintaining the same virtual drum diameter. An additional novel benefit of the re-entrant arms is the improved flow discharge from the arms. The flow of the liquid-vapor mixture is initially directed vertically upward in riser 40. This flow direction must be changed in the liquid-vapor separator from vertical, in the riser, to horizontal, at the outlet of the curved arms. Steam-water tests of Design A indicated a vertical component of the discharge flow from arms 38, FIG. 3, which contributed to and aggravated water spillage over the top of the liquid-vapor separator and consequent moisture carryover. Tests on Design B showed a horizontal flow discharge and a decreased moisture carryover, characteristic of the re-entrant arm feature of this invention. An additional performance improvement of liquid-vapor separator Design B over Design A was indicated by test values of pressure drop through the riser and arms. To maintain high circulation ratios in recirculating steam generators of the type shown in FIG. 1, it is necessary to minimize the resistance to flow in the liquid-vapor separator. Steam-water tests showed a pressure loss of 80 in. of water for the Design A separator compared to 40 in. of water for Design B at the same steam flow conditions, attributable primarily to lower permissible mixture velocities in the Design B separator because of the design improvements in the riser and arms, previously disclosed. Concentric with and in radially spaced surrounding relationship with riser 40 is virtual drum 42, FIG. 6. Drum 42 is open at its upper end for discharge of separated vapor and means are provided at the lower end for discharge of separated liquid.

Figure 9:
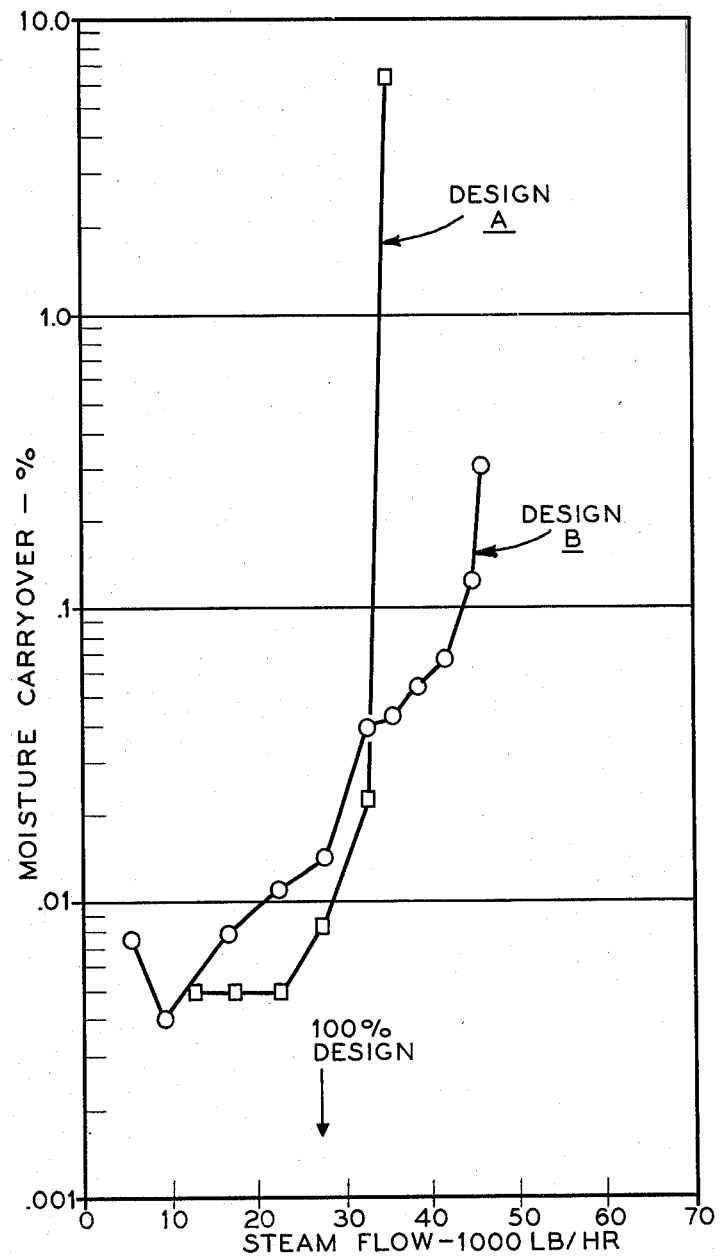
FIG. 9 is a plot of test results of moisture carryover in the design indicative of the prior art vs. the invention.

FIG. 9 shows a plot of test results of moisture carryover in percent by weight versus steam flow for the Design A and Design B separators and illustrates the greater capacity of the Design B separator. For a moisture carryover value of 0.25% the steam capacity of the Design A and Design B separators is approximately 32,000 lb./hr. and 46,000 lb./hr. respectively.

FIG. 10 illustrates water spillage over the top of the virtual drum for Design A and Design B separators as indicated by conductivity measurements. Water spilled over the virtual drum for all conditions on the Design A separator and only at over 140% of design loading on the Design B separator. FIG. 11 is a plot of test results of steam carryunder in percent by weight versus steam flow for Design A and Design B separators and indicates the improved performance characteristics of the invention. Steam carryunder was measured using static pressure taps to determine fluid density. In Design A indicative of the prior art the static pressure taps were located in the annulus formed by shroud 34 and virtual drum 36, FIG. 3. In the inventive design, the taps measured the carryunder in the annulus between riser 40 and virtual drum 42, FIG. 5. Test results indicated no carryunder for Design B within design flow limits whereas carryunder existed at all flows in Design A.

In summary, the improved design features of the stacked re-entrant arm separator over designs indicative of the prior art result in increased capacity, reduced vapor carryunder and moisture carryover, practical elimination of water spillage over the virtual drum and marked reduction in separator pressure losses.

The embodiments of the invention in which an exclusive property or privilege is claimed are defined as follows:

1. A liquid-vapor separator device comprising: a vertically disposed cylindrical drum concentric with and in spaced surrounding relationship with a riser, forming an annulus therewith, and having means for discharge of a separated liquid at its lower end and means for discharge of a separated vapor at its upper end, the riser serving as a conduit for a two-phase flow of a fluid, open at its lower end to admit a liquid-vapor mixture and closed at its upper end, the riser being formed of upper and lower sections interconnected by a frusto-conical section, the upper section having an internal diameter greater than that of the lower section, a first plurality of curved arms radially disposed at the upper section of the riser, one end of each arm extending within the riser and in flow communication therewith, the opposite end of each arm extending into the annulus for discharge of the fluid and a second plurality of curved arms below the first plurality of arms and contiguous thereto.

2. The liquid-vapor separator according to claim 1 wherein the ends of all of said curved arms are co-planar.

* * * * *